United States Patent
Chiu et al.

(10) Patent No.: US 10,063,372 B1
(45) Date of Patent: Aug. 28, 2018

(54) GENERATING PRE-ENCRYPTED KEYS

(71) Applicant: EMC Corporation, Hopinkton, MA (US)

(72) Inventors: Naizhong Chiu, Newton, MA (US); Radia Perlman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 15/081,197

(22) Filed: Mar. 25, 2016

(51) Int. Cl.
- *H04L 9/12* (2006.01)
- *H04L 9/08* (2006.01)
- *H04L 9/14* (2006.01)
- *H04L 29/06* (2006.01)

(52) U.S. Cl.
CPC .............. *H04L 9/0869* (2013.01); *H04L 9/14* (2013.01); *H04L 63/06* (2013.01)

(58) Field of Classification Search
None
See application file for complete search history.

(56) References Cited

U.S. PATENT DOCUMENTS

| | | | |
|---|---|---|---|
| 7,596,696 B1 | 9/2009 | Perlman | |
| 7,814,318 B1 | 10/2010 | Perlman et al. | |
| 8,300,831 B2 * | 10/2012 | Kahler | H04L 9/083 380/277 |
| 8,458,494 B1 * | 6/2013 | Bogorad | H04L 9/30 380/282 |
| 8,588,425 B1 * | 11/2013 | Harwood | H04L 9/0894 380/278 |
| 8,799,681 B1 * | 8/2014 | Linnell | G06F 21/62 380/277 |
| 9,189,642 B2 | 11/2015 | Perlman | |
| 9,659,190 B1 | 5/2017 | Perlman et al. | |
| 2008/0022122 A1 * | 1/2008 | Parkinson | H04L 63/061 713/185 |
| 2009/0180617 A1 * | 7/2009 | Peterka | H04L 9/083 380/277 |
| 2014/0321641 A1 * | 10/2014 | Khosravi | H04L 63/061 380/44 |
| 2014/0380047 A1 * | 12/2014 | Denning | H04L 9/0822 713/168 |

(Continued)

OTHER PUBLICATIONS

FADE: Secure Overlay Cloud Storage with File Assured Deletion. Tang et al. ICSSITE(2010).*

*Primary Examiner* — Venkat Perungavoor
(74) *Attorney, Agent, or Firm* — BainwoodHuang (57) ABSTRACT

Examples are generally directed towards providing key decryption for pre-encrypted keys. On identifying a portion of encrypted data to be decrypted, a computing device obtains a pre-encrypted key from a key manager. The pre-encrypted key is a random number generated by the key manager. The computing device decrypts the pre-encrypted key with a client-side wrapping key to obtain an actual key. The computing device decrypts the portion of the encrypted data with the actual key. The key manager is an un-trusted key manager without access to the wrapping key or the actual key. An unauthorized party obtaining access to the encrypted data and the pre-encrypted key stored by the key manager does not provide enough information to enable decrypting the encrypted data without also obtaining access to the client-side wrapping key stored remotely from the key manager.

18 Claims, 7 Drawing Sheets

(56) References Cited

U.S. PATENT DOCUMENTS

2015/0318986 A1* 11/2015 Novak .................. H04L 9/0894
                                                        713/189
2016/0241522 A1*  8/2016 Tien ..................... H04L 9/0822
2016/0277373 A1*  9/2016 Murray ................ H04L 63/061

* cited by examiner

GENERATING PRE-ENCRYPTED KEYS

BACKGROUND

Data storage systems frequently utilize Data at Rest Encryption to prevent data being accessed by unauthorized users and/or other information leaks. Data encryption is the process of encoding data based on a cryptographic key. In this manner, only an authorized user having the appropriate cryptographic key is able to decrypt the data. An unauthorized user intercepting the encrypted data is unable to read or utilize the encoded data without the appropriate key.

Some data storage systems generate and store their own cryptographic keys. However, storing keys on the same storage system as the encrypted data may increase the probability of the keys being lost or accessed by unauthorized parties. Therefore, some systems utilize an external key manager to generate and store the keys separately from the storage system. Other systems utilize a professional service to run the key manager, which stores one or more keys for multiple clients and/or multiple applications. These clients may be mutually distrustful clients.

An external key manager is frequently more secure for generating and storing keys than a data storage system, because it is typically a fairly simple, self-contained system that is not downloading potentially malicious applications. However, even key managers may become compromised or inadvertently divulge keys to unauthorized parties. This may be problematic because a party obtaining access to both the encrypted data and the keys stored by the key manager may be capable of decrypting and reading the encrypted data.

SUMMARY

Examples of the disclosure provide for a key decryption process. In an example, a portion of encrypted data stored on a data storage device that is to be decrypted is identified. A first key corresponding to the encrypted data is received from a key manager associated with a server. The first key is a random number generated by the key manager. A second key is retrieved. The second key is a client-side wrapping key generated by a computing device. The first key is decrypted by a key decryption component based on the second key to generate a third key. The portion of the encrypted data is decrypted with the third key to generate decrypted data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Many storage systems utilize data at rest encryption with keys to encrypt and decrypt data. As used herein, a storage system includes storage arrays, file systems, object systems, one or more databases, cloud storage, or any other type of data storage. However, the encryption keys may become compromised for technical reasons or due to unauthorized parties gaining access to the keys. For example, a key may be sent to the wrong party inadvertently or an administrator may access the keys for unscrupulous purposes. Therefore, keys generated by the data storage system itself may not be trustworthy.

For these reasons, users sometimes utilize an external key manager to generate and store encryption keys. These systems assume the key manager is completely secure. However, it is possible that even a key manager may not be completely secure against unauthorized users obtaining access to stored keys.

Referring to the figures, some examples of the disclosure provide a key decryption component that allows use of one or more key managers to generate, store, and/or send cryptographic keys without requiring complete trust in the key managers. Enabling utilization of a key manager without completely trusting the key manager improves security of data and keys.

In some examples, the key decryption component utilizes one or more client-side wrapping keys that are never seen by the key manager. All keys stored in the key manager are treated by the client as if the key was wrapped by a client-side wrapping key without changing how a typical key manager operates. The key manager is incapable of accessing the secret wrapping key. In this manner, an actual key capable of decrypting the client's data is not divulged to any unauthorized parties even if the key manager becomes completely compromised. This increases data and key transmission security as well as improving the reliability and security of stored keys.

Some examples provide a key decryption component on a computing system storing encrypted data at rest. A computing system may include a single computing device, a data storage system, a set of one or more computing devices, or a set of one or more data storage systems. A data storage system includes, without limitation, a set of one or more data storage devices and/or a set of one or more data storage arrays.

In other examples, the key decryption component retrieves a pre-encrypted key from one or more key managers. The key manager creates the pre-encrypted key by utilizing a key encryption algorithm to generate a random number as it would to generate any other secret key. This is possible because most encryption algorithms, such as Advanced Encryption Standard (AES), use any number of the correct size bits. Any random number of the correct key size is encrypted or decrypted with a key to generate another number of the correct size to be used as a cryptographic key. Examples of key sizes include, but are not limited to, 128 bit key size, 192 bit key size, and/or 256 bit key size. The examples may also be used with any other key bit size.

The key decryption component treats the random number generated by the key manager as a pre-encrypted, quasi-wrapped key. The key decryption component decrypts this random number using the wrapping key to generate the actual key. In this manner, the key is wrapped by a second, client-side wrapping key that the key manager does not see or access. Having a wrapped key generated in exactly the same way as a raw key is generated, without the system generating the key knowing the key will be treated as a wrapped key or knowing what the wrapping key is, provides increased security for stored encrypted data and keys, as well as improved reliability when utilizing external key managers.

In this example, the key decryption component retrieves a second, client-side wrapping key. The wrapped key is decrypted by the client-side wrapping key to generate a third key. The third key is the actual key that is utilized to decrypt encrypted data stored on a data storage device. In this manner, the key decryption component enables users to utilize a key manager to generate and store cryptographic keys without requiring complete trust in the key manager.

The key decryption component in some of the examples provides for improving security of stored data and increasing security of cryptographic keys. The key decryption component also reduces or eliminates the need for trusting one or more key managers. Even if one or more pre-encrypted keys stored on one key manager are divulged to an unauthorized party, the pre-encrypted keys does not provide enough information to enable decrypting the client's encrypted data without also obtaining access to the second, client-side wrapping key stored on a remote client, storage device, or different key manager. Likewise, if a wrapping key stored on a client, storage device, or key manager is divulged to an unauthorized party, the wrapping key does not provide enough information to enable decrypting the client's data without the pre-encrypted key stored on a different key manager. This layering of cryptographic keys further improves reliability of cryptographic keys and decreases client dependence on key manager trustworthiness.

If one or more key managers storing cryptographic keys should be compromised, the keys stored by the one or more external key managers are still protected by the client-side wrapping key(s). Thus, the utilization of key manager generated keys and client-side wrapping keys improves quality of pre-encrypted keys while reducing risk of keys being accessed by unauthorized parties.

The utilization of pre-encrypted keys and client-side wrapping keys further prevents unauthorized parties from accessing client data or actual encryption keys. This feature provides users with increased freedom and peace of mind when utilizing the services of key managers to generate and store keys.

Figure 1:
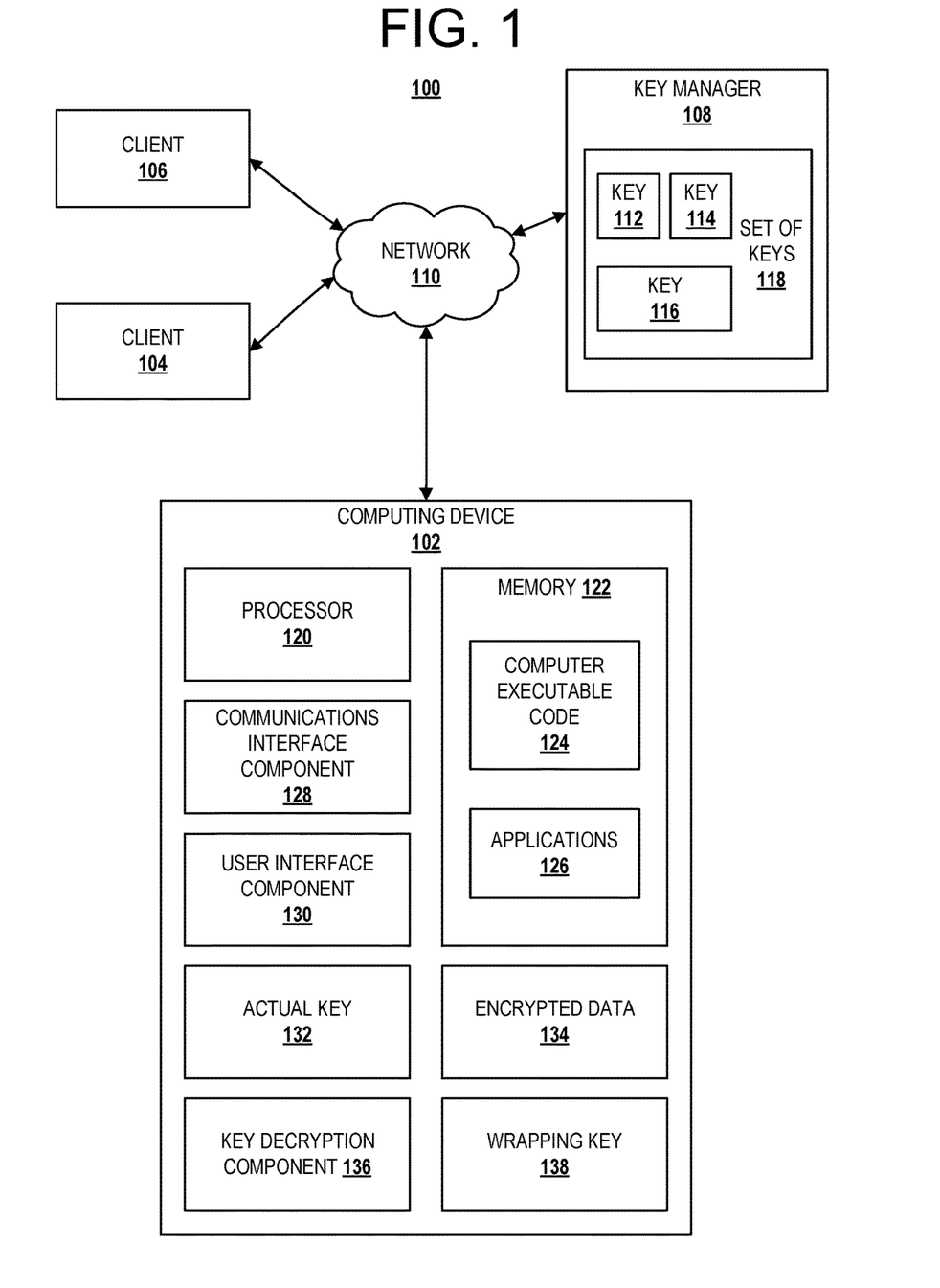
FIG. 1 is an exemplary block diagram illustrating a computing system including a key decryption component.

FIG. 1 is an exemplary block diagram illustrating a computing system including a key decryption component. Computing system 100 is a system for utilizing key manager generated key and client-side wrapping keys to generate secure cryptographic keys. Computing system 100 optionally includes one or more clients computing devices, such as computing device 102, client 104, and/or client 106.

Computing device 102 in this example represents any type of computing device executing instructions (e.g., as application programs, operating system functionality, or both) to implement the operations and functionality associated with the computing device 102. The computing device 102 includes a plurality of hardware components and a plurality of software components.

The computing device 102 may be implemented as a data processing system, a data storage device, cloud storage, a personal computer, kiosk, tabletop device, industrial control device, wireless charging station, an electric automobile charging station, or any other type of computing device utilizing one or more cryptographic keys to encrypt or decrypt data. Decrypted data may be referred to as plain-text data or unencrypted data.

A data storage device includes, for example but without limitation, one or more hard disks, one or more flash drives, one or more data storage arrays, as well as any other type of device for storing data. Additionally, the computing device 102 may represent a group of processing units or a group of other computing devices or data storage devices storing data, such as encrypted data 134.

Encrypted data 134 is any type of data encrypted using a cryptographic key, such as a symmetric or asymmetric cryptographic key. For example, encrypted data 134 may include a block, an entire disk, a file, an object, or the like.

In some non-limiting examples, metadata is associated with the encrypted data 134. The metadata is data describing other data. The metadata includes a key identifier (ID) of the encryption key used to encrypt the data. The metadata is used to determine which encryption key is appropriate to decrypt the encrypted data. In this example shown in FIG. 1, the metadata data includes a key ID identifying which pre-encrypted key stored on the external key manager 108 is requested by the key decryption component 136. The key ID in some examples is stored in a key table, key storage, key database, data structure or other data storage for storing identifiers.

A client, such as client 104 and 106 is implemented as a computing device, such as computing device 102. Clients 104 and/or 106 may be computing devices associated with a user. The clients 104 and 106 in this example are separate computing devices from computing device 102. In other words, the client 104 and 106 in some examples is located separately from or remotely to computing device 102.

In some examples, but without limitation, clients 104 and/or 106 are implemented as portable computing devices, such as, but without limitation, a smart phone, laptop, tablet, computing pad, netbook, gaming device, portable media player, or a wearable computing device, such as, without limitation, a smart watch. A portable computing device may also be referred to as a mobile computing device.

The key manager 108 is an external cryptographic key management component hosted on one or more servers remote to the computing device 102. The key manager 108 includes a random number generator for generating cryptographic keys. The key manager 108 generates, stores, and/or transmits one or more keys for one or more clients.

Each key stored on the key manager 108 is associated with a particular client. In this example, the key manager 108 stores a set of keys 118 associated with computing device 102, client 104, and/or client 106. However, in other examples, the key manager 108 may store a single key, as well as two or more keys. The key manager 108 may also store a plurality of keys for each client. In other words, a single client may store multiple keys on a single key manager.

The set of keys 118 in this example includes keys 112, 114, and 116. The keys 112, 114, and 116 may be implemented as any type of cryptographic key having any key bit size. The key bit size may also be referred to as a key length.

In this non-limiting example, key 116 is a pre-encrypted key. The pre-encrypted key is a random number value generated by the key manager. The pre-encrypted key is treated as a key wrapped inside another key by a client requesting the pre-encrypted key.

A wrapped key is a key wrapped in another key. In other words, a wrapped key is a cryptographic key encrypted by another, different key. A wrapped key in some examples is generated by encrypting a first key using a second key. To utilize the wrapped key to decrypt data, the wrapped key is unwrapped or decrypted to obtain the original cryptographic key.

The key manager generates the pre-encrypted key in the same manner that it generates any unwrapped key. A pre-encrypted key may also be referred to as a quasi-wrapped key because it is treated as a wrapped key by the client but it is not treated as a wrapped key by the key manager.

In this example, the key manager 108 includes a better random number generator than the client. In other examples, the key manager 108 includes a ransom number manager while the client does not include a random number generator. Therefore, in these examples, the client obtains the pre-encrypted key from the key manager.

In this non-limiting example, the pre-encrypted key is generated by the key manager without permitting the key manager to see or access the second key. The key manager does not wrap a first key in a second key to create the pre-encrypted key. Instead, the key manager 108 generates a random number, as it would generate any secret key. This key manager generated random number is the quantity or value of the pre-encrypted key 116.

Moreover, the key manager does not access, receive or view the second key during generation or storage of the pre-encrypted key. In fact, the key manager 108 is unaware of the existence of the second, wrapping key. The key manager 108 creates the pre-encrypted key without ever seeing the second key. The key manager 108 generates and stores the pre-encrypted key 116 in the same manner that it generates or stores any other unencrypted or unwrapped key.

The pre-encrypted key 116 does not provide enough information to enable decrypting the encrypted data 134 without one or more additional wrapping keys. The client receiving the pre-encrypted key, such as computing device 102 in FIG. 1, treats the pre-encrypted key 116 as if it were a key wrapped within another key.

In another example, the key manager 108 stores one or more keys not generated by the key manager 108. For example, the key 112 may be generated by a client or a second key manager. This client-generated key is then transmitted to the key manager 108 for storage.

The key manager 108 in some examples stores one or more keys generated by the key manager 108 and/or stores one or more keys generated by a client, a different key manager, user, or other entity capable of generating keys.

In this non-limiting example, the key manager serves three clients, including computing device 102, client 104, and client 106. In other examples, the key manager 108 may serve a single client, as well as two or more clients.

When multiple clients are using the same key manager, each different client uses different client-side keys. For example, client 104 utilizes one or more different wrapping keys which are completely different than the one or more wrapping keys utilized by the client 106. Therefore, even if client 104 obtains a pre-encrypted key for client 106, client 104 is unable to decrypt encrypted data associated with client 106 because client 104 does not have access to client-side wrapping keys belonging to client 106. The client-side wrapping keys belonging to client 106 may be stored on client 106, on another key manager, or on a cloud storage associated with client 106.

In some examples, when a first client obtains one or more pre-encrypted keys stored on the external key manager 108 belonging to a second client, the first client is unable to decrypt the second client's data unless the first client also obtains the second client's client-side wrapping key stored on the second client or a different key manager.

In this non-limiting example, the computing device 102 is depicted as utilizing only a single key manager 108. However, in other examples, a client such as computing device 102 may utilize two or more different key managers to generate, store, and transmit cryptographic keys to the computing device 102 via network 110.

In one example, the network 110 may be the Internet, intranet, Ethernet, or other wireless or hardwired connections by which the computing device 102 may send and receive data associated with one or more other computer systems, such as, but without limitation, client 104, client 106, key manager 108, as well as any other computing device(s) and/or key manager(s).

The computing device 102 communicates with the key manager 108 across the network 110. In one example, a client, such as the computing device 102, transmits a key ID to the key manager 108 via the network 110. In response, the key manager 108 returns a pre-encrypted key corresponding to the key ID to the client across the network 110.

The computing device 102 in this non-limiting example optionally includes a processor 120 and a memory 122 storing computer executable code 124 and/or one or more application(s) 126. The computer executable code 124 may also be referred to as computer executable program instructions 124.

The processor 120 includes any quantity of processing units. In some examples, the processor 120 includes a central processing unit (CPU) "A" and a CPU "B" (not shown). In other examples, the processor 120 may include only a single processing unit, as well as three or more processing units.

The processor 120 is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 6, FIG. 7 and FIG. 8).

In some examples, the processor 120 represents an implementation of analog techniques to perform the operations described herein. For example, the operations may be performed by an analog computing device and/or a digital computing device.

The computing device further has one or more computer readable media, such as the memory 122. The memory 122 includes any quantity of media associated with or accessible by the computing device. The memory 122 may be internal to the computing device (as shown in FIG. 1), external to the computing device (not shown), or both (not shown). In some examples, the memory 122 includes read-only memory and/or memory wired into an analog computing device.

The memory 122 stores data, such as one or more applications 126. The applications 126, when executed by the processor, operate to perform functionality on the computing device 102. Exemplary applications include mail application programs, web browsers, calendar application programs, address book application programs, messaging programs, media applications, location-based services, search programs, and the like. The applications may communicate with counterpart applications or services, such as web services accessible via network 110. For example, the applications may represent downloaded client-side applications corresponding to server-side services executing in a cloud.

The memory 122 further stores one or more computer-executable components. Exemplary components include a communications interface component 128, a user interface component 130 and a key decryption component 136.

In some non-limiting examples, the key decryption component 136, when executed by the processor of the computing device 102, causes the one or more processor(s) 120 to obtain a pre-encrypted key 116 from the key manager 108, retrieve a client-side wrapping key 138, decrypt the pre-encrypted key 116 using the wrapping key 138 to generate a third actual key 140, decrypt the encrypted data 134 using the actual key 140 to generate decrypted data, and output the decrypted data to an output device associated with one or more authorized users requesting the decrypted data. The actual key may be referred to as an unwrapped key. The decrypted data may also be referred to as unencrypted data.

In other words, the computing device 102 applies one or more client-side wrapping keys to unwrap or decrypt the pre-encrypted key to obtain one or more actual keys. The one or more actual keys are utilized to decrypt the encrypted data 134.

Thus, the key decryption component 136 enables storing keys at the key manager 108 encrypted with one or more client-side wrapping keys never seen by the key manager 108. Any keys may be pre-encrypted in this manner, whether generated by the key manager 108 or generated by a client, such as computing device 102 or a data storage system.

In the example of FIG. 1, the key manager generates the pre-encrypted key. In other examples, a client, such as computing device 102, generates the pre-encrypted key. In these examples, the client requests a key from the key manager 108. The key manager sends an original key to the client. The client key decryption component encrypts the key using the wrapping key 138 to create the pre-encrypted key. The client sends the pre-encrypted key to the same key manager or to a different key manager for storage and changes the metadata associated with the encrypted data 134 to identify the pre-encrypted key instead of the original key. When the client wants to decrypt the encrypted data, the client sends the key ID for the wrapped pre-encrypted key to the key manager storing the pre-encrypted key. The key manager sends the wrapped key back to the client in response. The client decrypts the wrapped key using the wrapping key to obtain the actual key.

In other examples, the computing device 102 generates an actual key. The computing device 102 encrypts the actual key with a secret, client-side wrapping key to create a pre-encrypted key. The computing device 102 sends the pre-encrypted key up to the external key server 108 for storage. When the computing device 102 retrieves the pre-encrypted key from the external key manager, the same decryption process applies in this example. The computing device 102 decrypts the pre-encrypted key by the wrapping key to obtain the actual key. The actual key is the final data encryption key.

In other examples, the computing device 102 includes a communications interface component 128. The communications interface component 128 includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

The computing device 102 optionally includes a user interface component 130. In some examples, the user interface component 130 includes a graphics card for displaying or outputting decrypted data to the user and receiving input data or commands from the user. The user interface component 130 may also include computer-executable instructions (e.g., a driver) for operating the graphics card. Further, the user interface component 130 may include a display (e.g., a touch screen display or natural user interface) and/or computer-executable instructions (e.g., a driver) for operating the display. In some examples, the user interface component 130 includes a graphical user interface (GUI). In other examples, the user interface component 130 includes a web browser.

The computing device 102 may also include one or more input/output device(s) (not shown) to provide data to one or more users and/or receive data from one or more users. The input/output device(s) may include, without limitation, one or more speakers, a sound card, a camera, a microphone, a vibration motor, one or more accelerometers, a BLUETOOTH brand communication module, global positioning system (GPS) hardware, and a photoreceptive light sensor. For example, a user may input commands or manipulate data by moving the computing device 102 in a particular way.

In other examples, the input/output device(s) include a display, such as a monitor, liquid crystal display (LCD), touch screen, plasma screen, image projection, holographic screen, holographic display, or any other type of visual display for displaying data, graphics and/or other images.

The computing device 102 in some examples optionally includes an application programming interface (API). In some examples, the API is optionally implemented as a Representational State Transfer (REST) API. For example, a REST API may be used in connection with a data storage system. A request may be issued via a REST API to GET data from a computing device, such as, but not limited to, a key server. In response, the server returns the requested data via one or more REST API responses.

Figure 2:
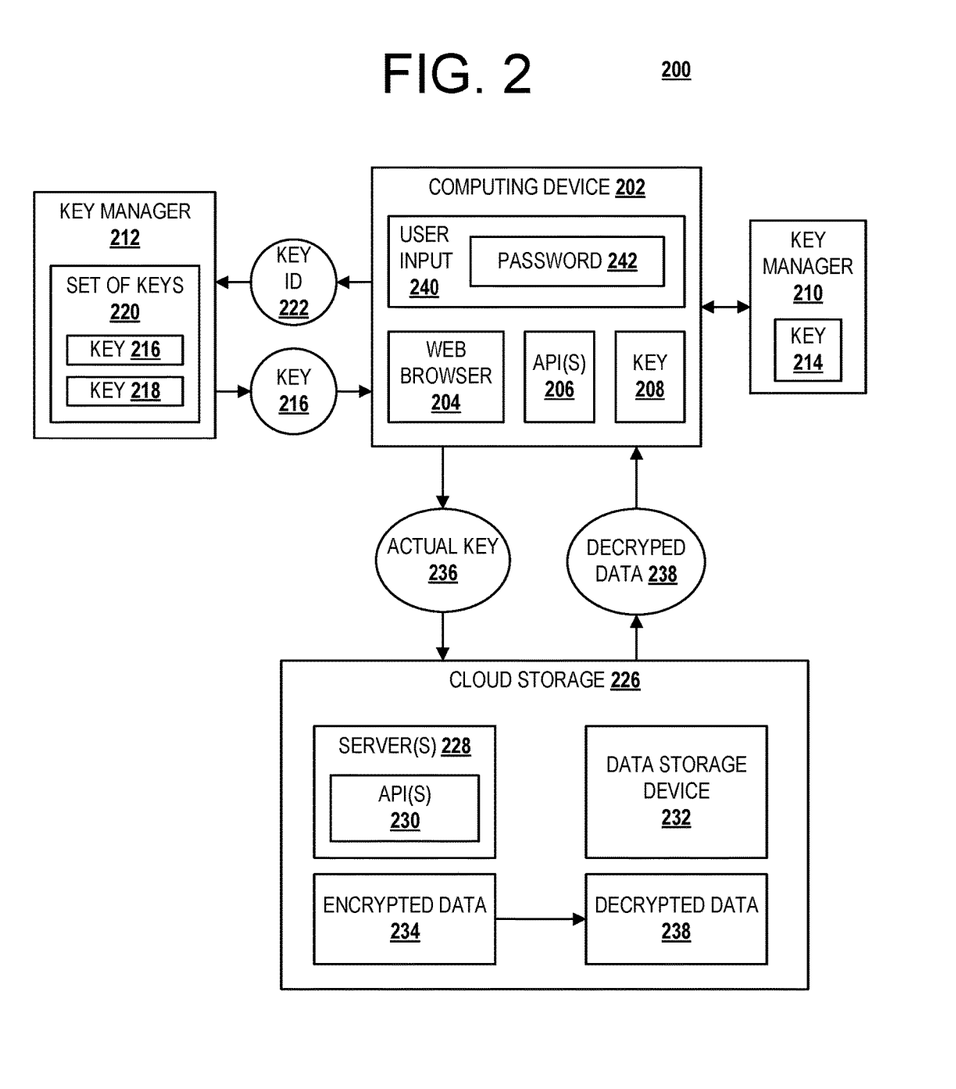
FIG. 2 is an exemplary block diagram illustrating utilization of wrapping keys with cloud storage.

Turning now to FIG. 2, an exemplary block diagram illustrating utilization of wrapping keys associated with cloud storage is shown. A computing system 200 may include a single computing device, as well as two or more computing devices. A computing device 202 is any type of computing device for utilizing client-side wrapping keys, such as computing device 102 in FIG. 1.

In some examples, the computing device 202 is a user device associated with a user, such as a mobile computing device. A mobile computing device may include, but is not limited to, a smart phone, a tablet, a laptop computing device, a smart watch or other wearable computing device.

The computing device 202 in this example optionally includes a web browser 204, Key Management Interoperability Protocol (KMIP) 206, and a client-side key 208. The key 208 in this example is a client-side wrapping key. The wrapping key 208 in this non-limiting example is generated by the computing device 202.

In some examples, the client utilizes KMIP for communicating with the key manager. KMIP is a network protocol providing standards for communications between storage systems and key managers. However, the examples are not limited to utilizing KMIP.

Key manager 210 and key manager 212 are key servers for generating, storing and/or sending one or more cryptographic keys to one or more clients, such as computing device 202. Key manager 212 in this example stores a set of keys 220. The set of keys 220 includes one or more keys, such as key 216 and key 218.

Likewise, key manager 210 stores key 214. In this example, key manager 210 is located remotely from key manager 212. If key manager 210 is compromised, the keys stored on key manager 212 located remotely to key manager 210 may still be secure.

Cloud storage 226 comprises one or more server(s) 228 providing data storage to one or more clients, such as computing device 202. A server in the one or more server(s) 226 may include an application server, a cloud server, software as a service (SaaS) server, a web server, a blade server, or any other type of server. Server(s) 228 optionally utilize KMIP 230 for communicating with key manager(s). The server(s) may also include one or more APIs (not shown) for communicating with one or more other computing devices.

Data storage device 232 includes one or more devices for storing data, such as encrypted data 234 and/or decrypted data 238. The data storage device 232 may include a data structure, a file system, and/or a data base for storing and managing data. In this example, the data storage device 232 is located external to with computing device 202 as part of the cloud storage 226.

The computing device 202 accesses the data storage device 202 remotely via a network connection. The network connection may be any type of network connection, including an Internet connection, an Ethernet connection, or any other type of network. However, in other examples, the data storage device 232 storing the encrypted data is located internally to the computing device 202.

In this example, computing device 202 is associated with a storage system customer having multiple client-side wrapping keys stored on key managers 210 and 212. The client wraps different keys stored in the key manager with different client-side wrapping keys, for various reasons including functions that are unsupported on external key managers, such as key roll-over and key expiration. For example, a client may delete a key or invalidate a key by deleting the client-side wrapping key associated with one pre-encrypted key stored on the key manager but not another wrapping key associated with a second pre-encrypted key. In this manner, a client controls which encryption keys stored on the key manager are valid and invalid simply by deleting or keeping the wrapping key associated with that pre-encrypted key.

In other examples, the cloud storage 226 utilizes a different wrapping key for each client and/or different portions of data stored on the cloud. This allows the storage system to delete all data associated with a particular client by destroying the wrapping key reserved for that client. Likewise, the client in some examples deletes or invalidates only a portion of the encrypted data associated with a particular key for a particular client by deleting the wrapping key associated with that portion of the encrypted data.

Other examples utilize a plurality of wrapping keys for supporting various security levels of encrypted data. For example, a client does not load wrapping keys associated with more secure or sensitive data when operating in a less trusted environment. In other examples, one wrapping key is encrypted with another wrapping key for increased security of at least a portion of the data.

In still other examples, the key decryption component identifies which client-side wrapping key to apply to each pre-encrypted key retrieved from the key manager utilizing a key ID. In one example, the cloud storage 226 maintains a table of key IDs including a "key ID, wrapping key ID" entry for each key, where the "key ID" is the ID of the key as known by external key manager, and the "wrapping key ID" identifies which of the client-side wrapping keys should be applied to the retrieved pre-encrypted key.

In other examples, an attribute is stored with the key on the key manager. This attribute may be a "wrapping key ID". The wrapping key ID is stored by the key manager along with the pre-encrypted key.

In this non-limiting example, computing device 202 sends a request for a cryptographic key to key manager 212. The request includes a key ID 222 identifying which key in the set of keys 220 is requested by the computing device. The requested key associated with key ID 222 in this example is a pre-encrypted key.

The request in these examples may be sent using any application for sending, receiving, retrieving, or traversing data on the Internet and/or the World Wide Web (WWW), such as, but not limited to, the web browser 204, a cloud application, or any other type of application. The computing device 202 in this example sends data to the key managers 210 and 212 and receives data from the key managers 210 and 212 via the network connection, such as network 110 in FIG. 1.

The key responds to the request by sending the pre-encrypted key 216 associated with Key ID 222 to the computing device 202. The key manager 212 transmits the pre-encrypted key to the computing device 202 via the network connection in some examples. In other examples, the key manager 212 sends the pre-encrypted key 216 to the computing device 202 via a web browser, cloud application, or any other type of application for sending, receiving, retrieving, and/or traversing data on the Internet.

On receiving the pre-encrypted key 216 from the key manager 212, a key decryption component associated with computing device applies a client-side wrapping key 208 to the pre-encrypted key 216 to generate an actual key 236. The encrypted data 234 is decrypted using the actual key 236 to generate the decrypted data 238.

In this manner, the computing device 202 treats the pre-encrypted key 116 generated by the key manager as if it were a wrapped key. The pre-encrypted key 216 is generated by the key manager 212 without notifying the key manager 212 that the key 216 does not provide enough information to enable decrypting the encrypted data. In other words, the key manager 212 generates and stores the encrypted key 216 without having access to the client-side wrapping key 208.

In this example, the wrapping key 208 is generated by the computing device 202 and stored locally on the computing device 202. However, in other examples, the computing device 202 generates the wrapping key 208 but stores the wrapping key remotely to the computing device 202. For example, the wrapping key 208 may be stored on a data storage device, on cloud storage or cloud server, on a different key manager, on a flash drive or universal serial bus (USB) memory stick, or any other type of storage apart from the computing device 202.

In other examples, the computing device 202 generates the key 208 and sends the key 208 to a different key manager 210 to store the key 208. On obtaining the key 216 from the first key manager 212, the computing device 202 retrieves the wrapping key from the second key manager 210. In other words, the computing device 202 receives the first key 216 from the first key manager 212 and receives the second key 208 from the second key manager 210. The key decryption component of the computing device 202 then decrypts the first key 216 using the second key 208 to obtain the actual key 236.

In another example, the wrapping key 208 is generated, in whole or in part, based on a user input, such as a password 242, user login, or other information entered by a user, such as an administrator or customer. In this example, the user enters the login information, password, or other information via a user input 240. The user input 240 is implemented, in some examples, as any type of user input/output device, such as a keyboard, mouse, touch screen, touch pad, speech recognition software, scanner, microphone, camera, or any other device for receiving input from a user.

In other examples, the wrapping key is unlocked when the customer or user associated with a client logs into the computing device or data storage system. In still other examples, the key decryption component hashes a user's name with an overall state to generate the wrapping key. In still other examples, the key decryption generates the wrapping key based on two or more pieces of information, such as state data, a user's name, login, password, customer ID, or other information.

In still other examples, the wrapping key 208 may be provided in whole or in part by two or more different key managers. In other words, each key manager may provide part of the wrapping key 208 to the computing device 202.

In still another example, the wrapping key 208 is a combination of a key and a user password 242, login, or other information entered by the user. In this example, to obtain the wrapping key 208, the computing device 202 obtains a key and a password or other user input which are utilized to generate the client-side wrapping key 208.

In still another example, the pre-encrypted key 216 is a first pre-encrypted key. The first pre-encrypted key is decrypted using a first wrapping key to generate a second pre-encrypted key. The second pre-encrypted key may be referred to an intermediate key. The second pre-encrypted key is then decrypted using a different, second wrapping key to generate the actual key. The actual key is used to decrypt the encrypted data to generate the decrypted data.

In this example shown in FIG. 2, the computing device 202 utilizes two key managers. However, in other examples, the computing device 202 may utilize three or more different key managers to generate, store, and send keys, such as client-side wrapping keys and/or pre-encrypted keys.

The key managers 210 and 212 in this example are providing keys to a single client, computing device 202. In other examples, the key managers 210 and 212 generate and store a plurality of keys for a plurality of different clients.

Likewise, in this example, the computing system 202 obtains the pre-encrypted key and/or the wrapping key from one or more key managers and sends the actual key 236 to the cloud storage 226 to obtain the decrypted data 238. However, in other examples, one or more servers associated with the cloud storage 226 obtains the wrapping key 208 and the pre-encrypted key 216 from the key managers and/or the computing device directly from the one or more key managers. For example, a key decryption component associated with the one or more servers 228 decrypts the pre-encrypted key 216 using the wrapping key 208 to obtain the actual key 236 without assistance from the computing device 202.

In still another example, a first wrapping key is utilized to decrypt a first pre-encrypted key to obtain a first actual key. The first actual key is utilized to decrypt a first set of encrypted data to obtain a first set of decrypted data. A second wrapping key is utilized to decrypt a second pre-encrypted key to obtain a second actual key. The second actual key is utilized to decrypt a second set of encrypted data to obtain a second set of decrypted data. In this manner, different wrapping keys may be utilized to encrypt and/or decrypt different pre-encrypted keys to obtain different actual keys associated with different sets of data. In other words, one wrapping key is used to encrypt or decrypt an actual key for encrypting or decrypting first set of data while a different wrapping key is used to encrypt or decrypt an actual key associated with a second set of data on the same data storage device or cloud. The first and second pre-encrypted keys of the examples may be generated and stored at the same key manager or generated and stored by different key managers, such as key managers 210 and 212.

Thus, in some examples, multiple sets of data are encrypted using multiple different actual key corresponding to multiple different wrapping keys and pre-encrypted keys. Thus, different wrapping keys and/or different pre-encrypted keys are used to encrypt and/or decrypt different sets of data for one or more different clients of the cloud.

In another example, a given actual key may be encrypted by a first wrapping key to obtain a first pre-encrypted key which is sent to a first key manager for storage by the first key manager. The same actual key is encrypted by a second client-side wrapping key to obtain a second, different pre-encrypted key which is sent to a second key manager for storage by the second key manager. In this manner, the same actual key may be obtained using the first pre-encrypted key decrypted by the first wrapping key or by obtaining the second pre-encrypted key and decrypting it using the second wrapping key. The first and second pre-encrypted keys in this example may be generated and stored at the same key manager or generated and stored by different key managers, such as key managers 210 and 212.

In still another example, the pre-encrypted key is stored at a first key manager and the wrapping key is stored at a second key manager. The client obtains the pre-encrypted key from the first key manager 210 and requests the wrapping key from the second key manager 212. The client decrypts the pre-encrypted key by the wrapping key to obtain the actual key. Thus, the wrapping key may be stored by the cloud storage 226 on the cloud itself, on a computing device associated with a client of the cloud, or on a second key manager. The client of the cloud in some examples is a customer of the cloud storage system.

Figure 3:
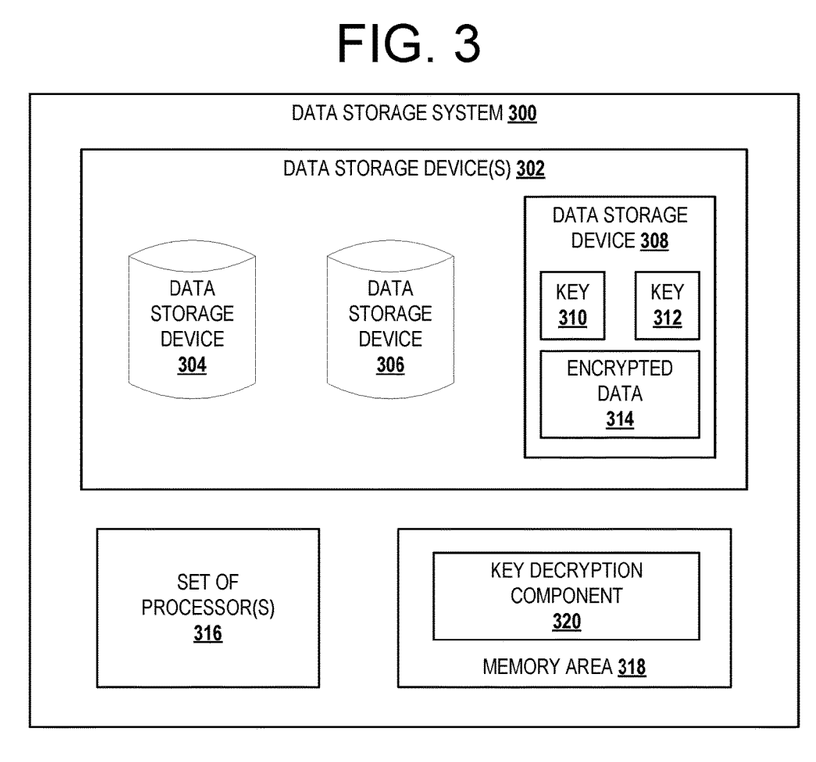
FIG. 3 is an exemplary block diagram illustrating a data storage system utilizing client-side keys.

FIG. 3 is an exemplary block diagram illustrating a data storage system utilizing wrapping keys. The data storage system 300 is a system for storing and managing data. The data storage system 300 includes a set of one or more data storage device(s) 302.

Data storage device(s) 302 may include, for example, one or more data storage arrays, one or more rotating magnetic storage devices, one or more rotating optical storage devices, one or more solid state drives (SSDs), one or more hard disk drives (HDD), one or more flash drives, and/or one or more optical disks. A data storage array may be, for example, a redundant array of inexpensive disks (RAID) array, an optical storage array, or any other type of data storage array.

In this non-limiting example, data storage device(s) includes data storage device 304, data storage device 306 and data storage device 308. However, the examples are not limited to three data storage devices. In other examples, the data storage system 300 may include a single data storage device, two data storage devices, as well as four or more data storage devices.

In still other examples, the data storage system 300 optionally includes a data center. A data center is a facility that may include a one or more networked computer servers, data storage devices, as well as other hardware and software for storing and managing data.

In this example, the data storage device 308 includes a set of keys, including key 310 and key 312. Although this example depicts two keys stored on the data storage system 300, the data storage system 300 may store any number of keys. For example, the data storage system may store a single key, as well as three or more keys.

The data storage system 300 includes a set of processor(s) 316 and a memory 318 storing a key decryption component 320. The data stored on data storage system 300 includes encrypted data 314. The encrypted data 314 is data encrypted using one or more secret cryptographic keys. In this example, only encrypted data 314 is shown on data storage device 308. However, a data storage device may also store unencrypted data, as well as decrypted data.

The encrypted data 314 is depicted as data associated with a single client, partition and/or data set. However, in other examples, encrypted data 314 may include data associated with a plurality of different clients stored on a plurality of different partitions or data sets within the data storage system 300.

In some examples, part of the encrypted data within the encrypted data 314 may be data associated with a client "A" while another part of the encrypted data within the encrypted data 314 may be data belonging to or associated with a client "B". The part of the encrypted data for client "A" may be unencrypted using an first actual key while the part of the encrypted data for client "B" may be unencrypted using a different, second actual key belonging to client "B". In this manner, an actual key generated for client "A" is unable to decrypt data belonging to client "B". Likewise, an actual key associated with client "B" does not provide enough information to enable decrypting the part of the encrypted data 314 that is associated with client "A". Thus, the data storage device 308 may be storing different client-side wrapping keys for different client customers of the data storage system.

In one example, the client-side wrapping key 312 for client "B" is decrypts the pre-encrypted key for client "B" to generate the appropriate actual key capable of decrypting the portion of the encrypted data 314 belonging to client "B." Likewise, the client-side wrapping key 310 associated with client "A" decrypts the pre-encrypted key generated for client "A" to unwrap the actual key able to decrypt the portion of the encrypted data 314 associated with client "A."

On determining that at least part of the encrypted data 314 is to be decrypted, the key decryption component 320 obtains a key from a key manager, decrypts that key using a second, client-side key that is unknown to the key manager to produce a third, actual key. The data storage system decrypts at least part of the encrypted data 314 using the actual key.

The key manger never obtains or gains access to the actual key for decrypting the encrypted data. Even if the key manager becomes compromised and an unauthorized party gains access to the key manager and the encrypted data, the unauthorized party is unable to decrypt the encrypted data 314 without also obtaining access to the second client-side wrapping key. The second client-side wrapping key in this example may be stored on the data storage system, stored on a remote computing device, stored on a second key manager, stored on a set of two or more different key managers, or provided by a user or other entity.

Figure 4:
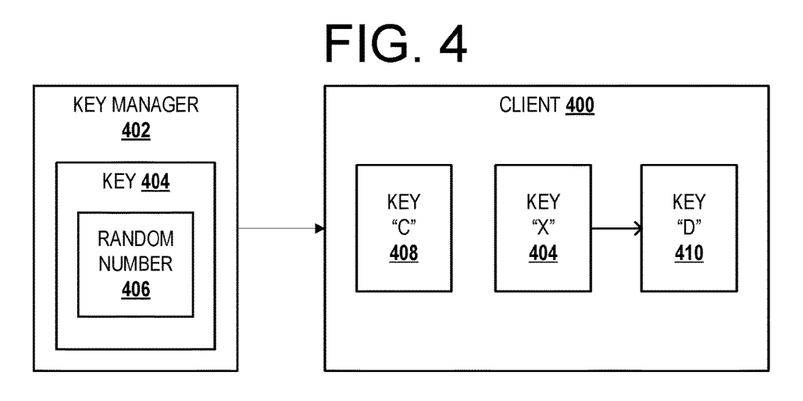
FIG. 4 is a block diagram illustrating a client utilizing a client-side wrapping key to generate an actual key.

FIG. 4 is a block diagram illustrating a client utilizing a client-side wrapping key to generate an actual key. The client 400 is any type of computing device or data storage system utilizing keys for encrypting and decrypting data.

In one non-limiting example, the key manager 402 generates a pre-encrypted key 404 having a quantity "X". The key manager 402 creates the pre-encrypted key 404 by generating a random number 406 having a predetermined key bit size corresponding to a key bit size of the encryption key requested by the client 400.

The client 400 stores a client-side wrapping key 408 having a quantity "C". The client 400 decrypts the pre-encrypted key 404 with the wrapping key 408 to obtain an actual key 410. In other words, the client 400 decrypts "X" with the quantity "C" to generate the actual key 410 quantity "D." The actual key 410 is utilized by the client 400 and/or a data storage device to decrypt encrypted data.

This is equivalent to generating a key "D," and then encrypting the key "D" with the client-side wrapping key "C" to obtain the key "X" stored in the key manager 402. In this manner, the key manager 402 generates and stores keys wrapped with the client-side wrapping key "C", without ever seeing the wrapping key "C."

In another example, the client 400 is a customer of the key manager 402 storing a secret wrapping key 408. The wrapping key 408 in this example has a quantity "S". When the client 400 requests that the key manager 402 generate an encryption key 404 having a given key length, the key manager 402 generates and stores a quantity "Z". The client 400 decrypts the key 404 having the quantity "Z" by the wrapping key 408 having value "S1" to obtain the value "Y" of the actual key 410. Here, the pre-encrypted key value is as follows:

$$Z=\{Y\}S1$$

in which the pre-encrypted key "Z" is equal to the actual key 410 value "Y" encrypted with the wrapping key "S". The key manager 402 generates the key having the quantity "Z", but the client 400 assumes that the value of the encryption key is {Y} S, in which "Y" is wrapped in "S". When the client 400 requests the key 404, the key manager 404 sends the quantity "Z" to the client 400. The client 400 decrypts the quantity "Z" of the pre-encrypted key with the wrapping key "S" to obtain the actual key value "Y". The actual key "Y" is the key value that the client 400 actually uses to decrypt part or all of the encrypted data.

Figure 5:
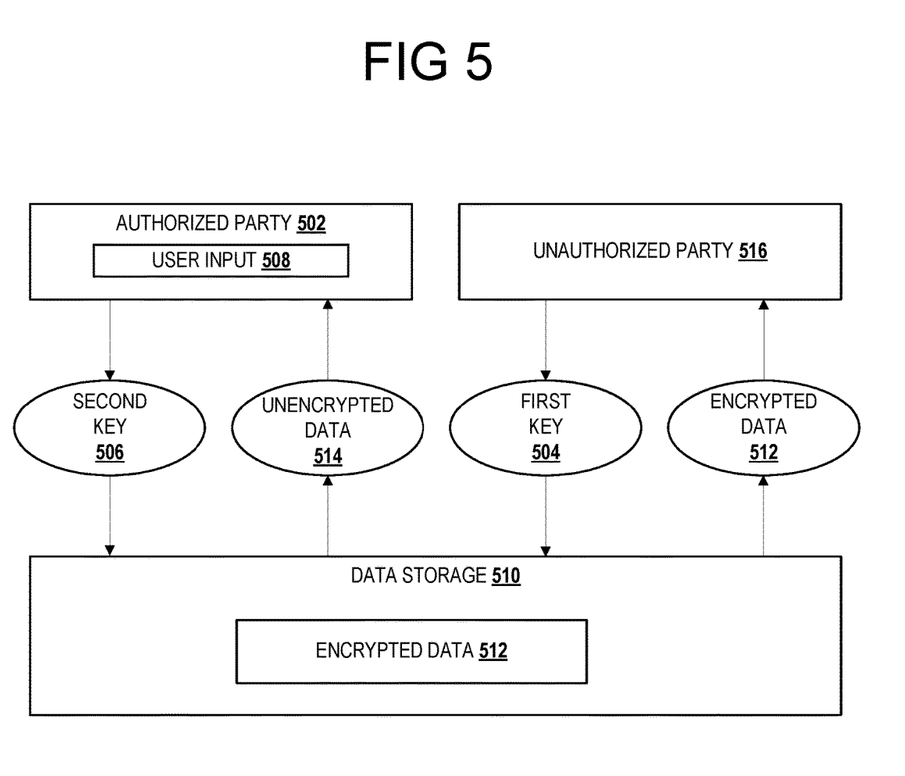
FIG. 5 is a block diagram illustrating decryption of encrypted data utilizing a client-side wrapping key.

FIG. 5 is a block diagram illustrating decryption of encrypted data utilizing a client-side wrapping key. In this example, an authorized party 502 requests encrypted data 512 stored on a data storage 510 be decrypted and output to the authorized party 502. The data storage 510 obtains a first key 504 from a key manager.

The data storage 510 in this example obtains a client-side wrapping key 506 from the authorized party 502. The authorized party 502 may provide the second key 506 by entering user input 508, such as a password, login information, user name, user ID, or other information. The authorized party 502 may also provide the wrapping key 506 via a USB stick or ignition key. An ignition key is a piece of data not stored on the data storage that is provided on reboot. An ignition key may include a key, password, or other information.

The data storage 510 utilizes the wrapping key 506 to decrypt the first key 504 to generate an actual key. The data storage 510 utilizes the actual key to decrypt the encrypted data 512. The data storage 510 outputs the decrypted data 514 to an output device associated with the authorized party 502.

The output device may include a display screen for displaying an image, a projector for displaying a projected image, a printer for outputting a printout, a speaker for generating audio output, or any other type of data output device.

If an unauthorized party 516 obtains access to the encrypted data 512 and the first key 504 stored on the key manager, the unauthorized party 516 is unable to decrypt the encrypted data without the client-side wrapping key 506. In this manner, a user is able to utilize a key manager for generating keys without completely trusting the key manager to not divulge the client's key because the key manager does not see or have access to the wrapping key 506.

Figure 6:
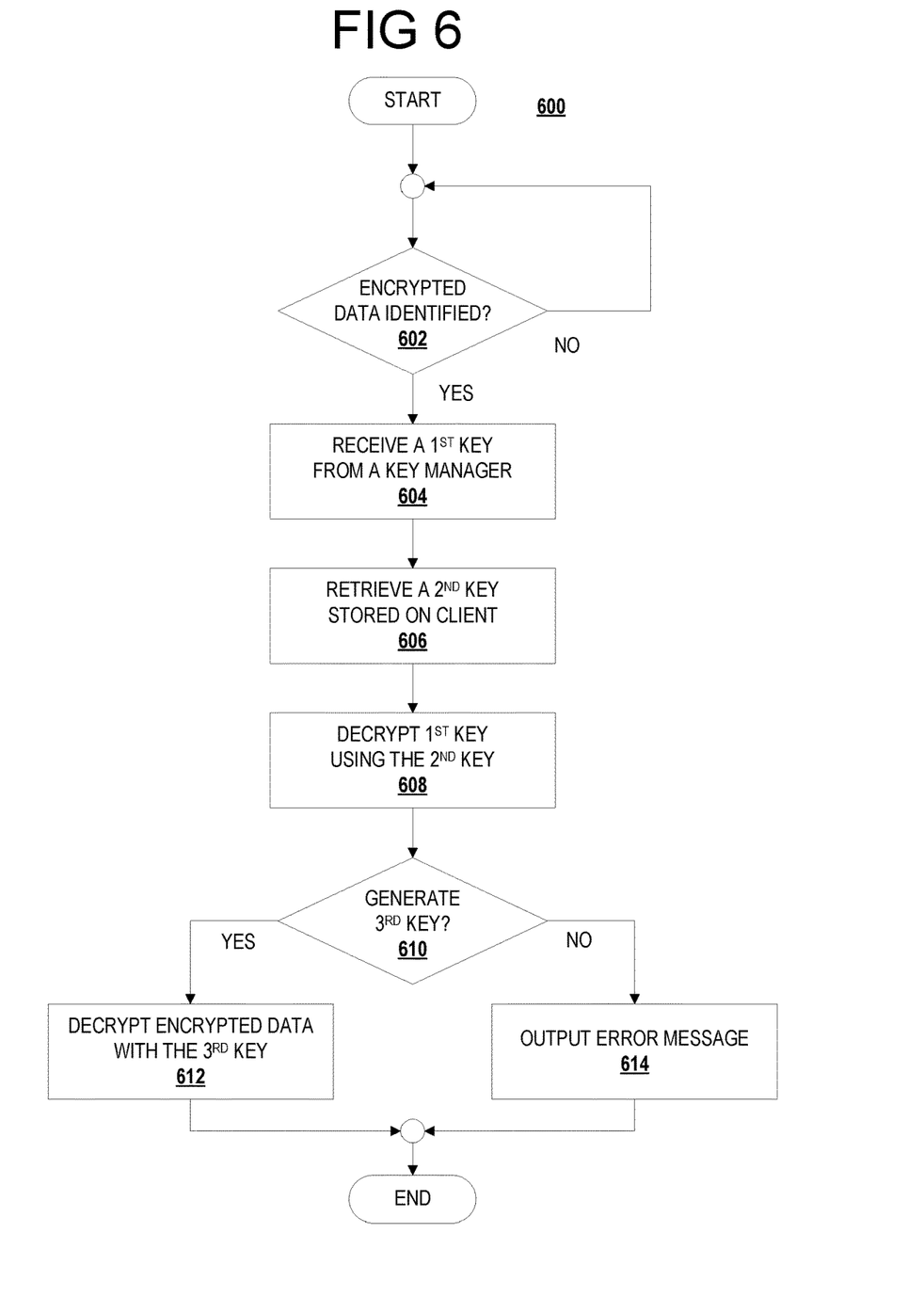
FIG. 6 is an exemplary flowchart illustrating a process for utilization of client-side keys.

FIG. 6 is an exemplary flowchart illustrating a process for utilization of client-side keys. The process shown in FIG. 6 may be implemented by a computing device, such as, but without limitation, computing device 102 in FIG. 1, a computing device 202 in FIG. 2, one or more server(s) 228, data storage system 300 in FIG. 3, client 400 in FIG. 4, or data storage 510 in FIG. 5.

The process determines if encrypted data is identified at 602. If no, the process returns to 602 until encrypted data to be decrypted is identified.

On determining encrypted data is identified at 602, the process receives a first key from a key manager at 604. The process retrieves a second key stored on the client at 606. The first key is decrypted using the second key at 608.

On determining the decryption of the first key using the second key generates a third key at 610, the process decrypts the encrypted data with the third key at 612. The process terminates thereafter.

Returning to 610, on determining a third key is not generated, the process outputs an error message at 614. The process terminates thereafter.

While the operations illustrated in FIG. 6 are described as being performed by a client computing device or data storage system, aspects of the disclosure contemplate that performance of the operations by other entities. For example, a cloud service may perform one or more of the operations.

Figure 7:
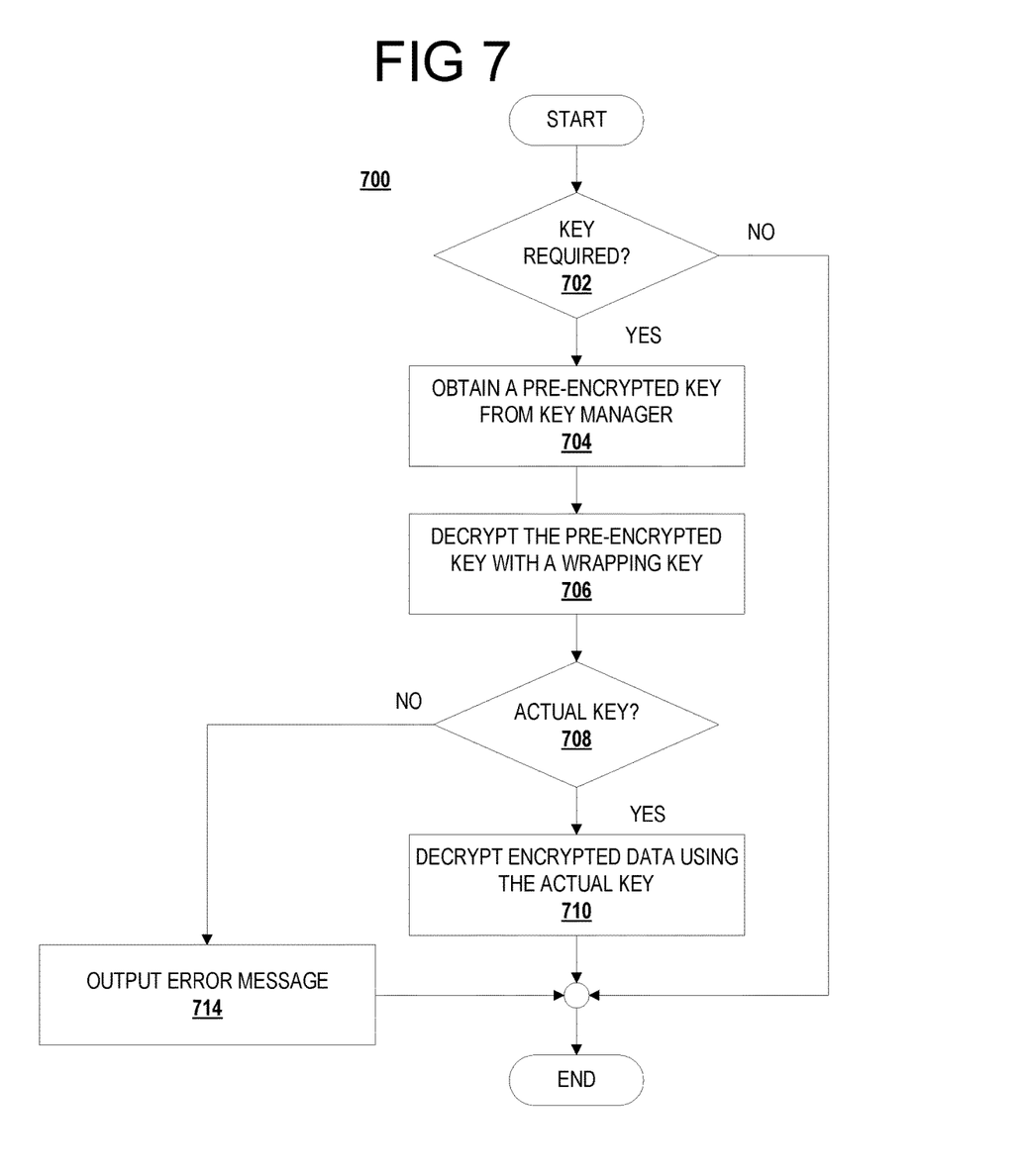
FIG. 7 is an exemplary flowchart illustrating a process for decrypting keys utilizing a client-side wrapping key.

FIG. 7 is an exemplary flowchart illustrating a process for decrypting keys utilizing a client-side wrapping key. The process shown in FIG. 7 may be implemented by a computing device, such as, but without limitation, computing device 102 in FIG. 1, a computing device 202 in FIG. 2, one or more server(s) 228, data storage system 300 in FIG. 3, client 400 in FIG. 4, or data storage 510 in FIG. 5.

The process determines if a key is required from a key manager at 702. If yes, the process obtains a pre-encrypted key from the key manager at 704. The process decrypts the pre-encrypted key with a wrapping key at 706. The process determines if an actual key is generated at 708. If yes, the process decrypts the encrypted data using the actual key at 710. The process terminates thereafter.

Returning to 706, on determining the actual key is not generated by decrypting the key with the wrapping key, the process outputs an error message at 710. The process terminates thereafter.

Returning to 702, the determination is made as to whether a key is required. If a key is not required, the process terminates thereafter.

While the operations illustrated in FIG. 7 are described as being performed by a client computing device or data storage system, aspects of the disclosure contemplate that performance of the operations by other entities. For example, a cloud service may perform one or more of the operations.

Figure 8:
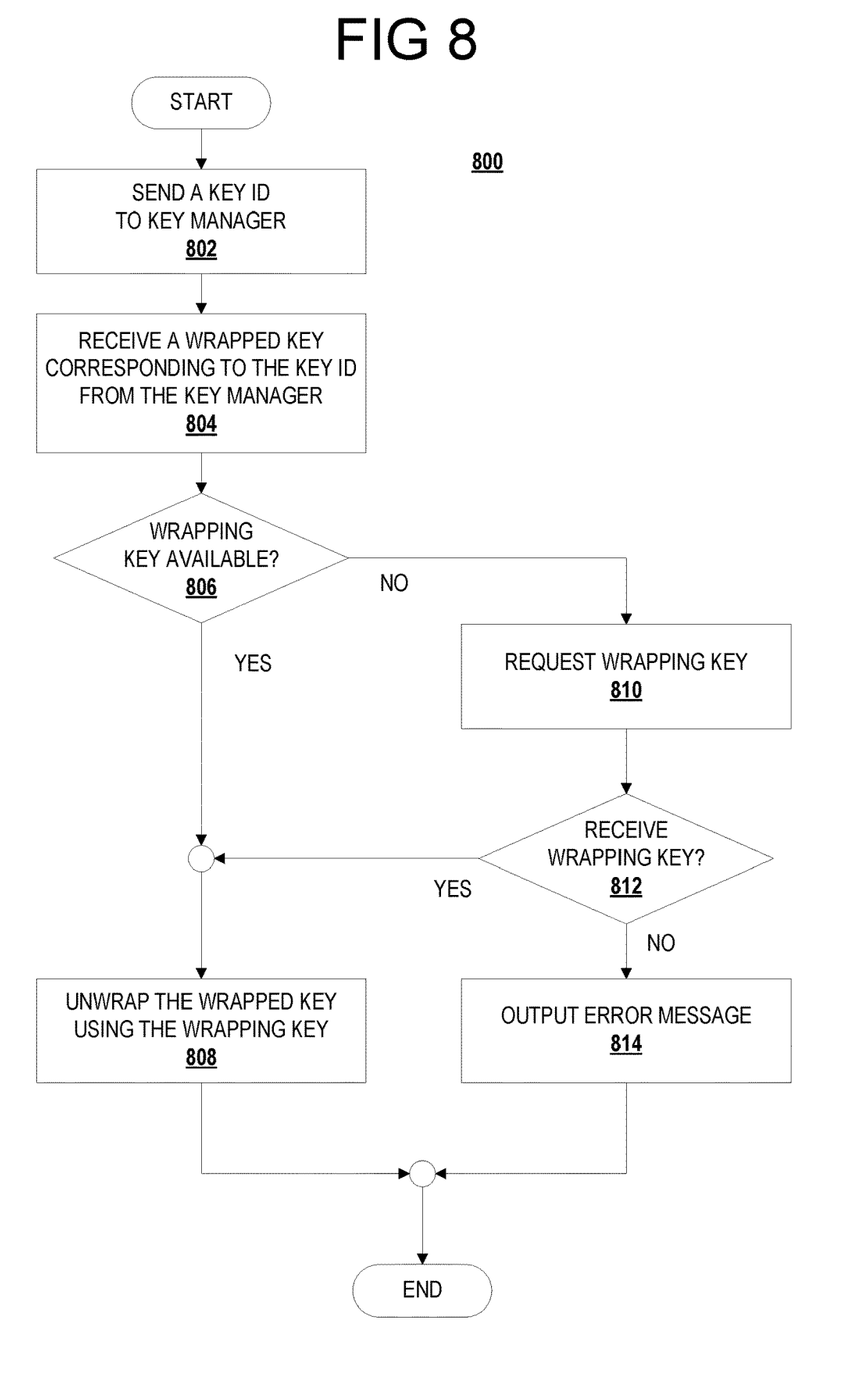
FIG. 8 is an exemplary flowchart illustrating a process for utilizing key identifiers associated with one or more keys.

FIG. 8 is an exemplary flowchart illustrating a process for utilizing key identifiers associated with one or more keys.

The process shown in FIG. 8 may be implemented by a computing device, such as, but without limitation, computing device 102 in FIG. 1, a computing device 202 in FIG. 2, one or more server(s) 228, data storage system 300 in FIG. 3, client 400 in FIG. 4, or data storage 510 in FIG. 5.

The process sends a key ID to a key manager at 802. The process receives a pre-encrypted key corresponding to the key ID from the key manager at 804. On determining a wrapping key is available at 806, the process decrypts the pre-encrypted key using the wrapping key at 808 to generate the actual key. The process terminates thereafter.

Returning to 806, on determining the wrapping key is not available at the client, the process requests the wrapping key at 810. The wrapping key may be requested from a second key manager, from data storage associated with the client, from cloud storage, and/or from one or more users or other entities. On determining the wrapping key is received at 812 the process decrypts the key using the wrapping key at 808. The process terminates thereafter.

Returning to 812, on determining the wrapping key is not received, the process outputs an error message at 814. The process terminates thereafter.

While the operations illustrated in FIG. 8 are described as being performed by a client computing device or data storage system, aspects of the disclosure contemplate that performance of the operations by other entities. For example, a cloud service may perform one or more of the operations.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer readable instructions, data structures, program modules, or the like in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating wrapping keys for encrypting and decrypting data for a computing system. For example, the elements illustrated in FIG. 1, such as when encoded to perform the operations illustrated in FIG. 6, FIG. 7 and/or FIG. 8, constitute exemplary means for decrypting a key manager generated pre-encrypted key using a client-side wrapping key to obtain an actual key for decrypting data.

More specifically, the key decryption component illustrated in FIG. 1, such as when encoded to perform the operations illustrated in FIG. 6, FIG. 7 and/or FIG. 8, constitute exemplary means for identifying encrypted data stored on a data storage device that is to be decrypted; exemplary means for receiving a pre-encrypted key corresponding to the encrypted data from a key manager associated with a server; exemplary means for retrieving a wrapping key generated by the computing device; exemplary means for decrypting the pre-encrypted key based on the wrapping key to generate an actual key; and exemplary means for decrypting encrypted data with the actual key to generate decrypted data.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it is apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:
   identifying a portion of encrypted data stored on a data storage device that is to be decrypted;
   receiving a first key corresponding to the encrypted data from a remote key manager associated with a server via a network, the first key is a random number generated by the key manager;
   retrieving a second key generated by a computing device;
   decrypting, by a key decryption component associated with the computing device, the first key based on the second key to generate a third key, the third key corresponding to the decrypted first key;
   decrypting the encrypted data with the third key to generate decrypted data, wherein the first key is a first pre-encrypted key, the second key is a first wrapping key, and the key manager is a first key manager;
   decrypting the first pre-encrypted key based on the first wrapping key to generate a second pre-encrypted key;
   decrypting the second pre-encrypted key based on a second wrapping key to generate an actual key, the second wrapping key is received from a second key manager via the network, wherein the second key manager is a different key manager than the first key manager; and
   decrypting the portion of the encrypted data using the actual key to generate decrypted data.

2. The computer-implemented method of claim 1 wherein the key manager stores a plurality of keys, and further comprising:
   retrieving a key identifier (ID) corresponding to the first key from a key table associated with the computing device; and
   sending the key ID to the key manager, wherein the key manger sends the first key from the plurality of keys to the computing device based on the key ID.

3. The computer-implemented method of claim 1, wherein the key manager is a first key manager associated with a first server, and further comprising:
   sending a key ID corresponding to the second key to a second key manager associated with a second server, wherein the second key manager stores the second key generated by the computing device; and
   receiving the second key from the second key manager.

4. The computer-implemented method of claim 1, further comprising:
   outputting the decrypted data to a user device, the decrypted data comprising plain-text data.

5. The computer-implemented method of claim 1 wherein the second key is generated based at least in part on at least one user input.

6. The computer-implemented method of claim 1 further comprising:
retrieving the second key from a key storage associated with the data storage device, wherein the second key is stored on the data storage device.

7. The computer-implemented method of claim 1, wherein the second key is a first client-side wrapping key, and further comprising:
receiving a fourth key from a second key manager via the network, the fourth key is a second client-side wrapping key; and
wherein decrypting the first key includes decrypting the first key based on both the second key and the fourth key to generate the third key.

8. The computer-implemented method of claim 1 further comprising: sending a request to a first key manager to generate a pre-encrypted key;
on receiving the pre-encrypted key from the key manager, encrypting the pre-encrypted key by a wrapping key to generate an actual key; and
encrypting data using the actual key to generate the encrypted data;
storing the encrypted data on the data storage device; and
storing the pre-encrypted key on the key manager, wherein the key manager is unaware of the wrapping key and the actual key, wherein a party obtaining unauthorized access to the encrypted data and the pre-encryption key does not provide enough information to enable decrypting the encrypted data without the wrapping key.

9. One or more computer storage media embodying computer executable components, said components comprising a key decryption component that, when executed, cause at least one processor to:
on determining at least a portion of encrypted data stored on a data storage device is to be decrypted, obtain a pre-encrypted key from a key manager associated with a server via a network, the pre-encrypted key is generated by the key manager, wherein the pre-encrypted key does not provide enough information to enable decrypting the at least the portion of the encrypted data;
retrieve a wrapping key generated by a client, the wrapping key is a client-side cryptographic key stored remotely from the key manager;
decrypt the pre-encrypted key using the wrapping key to generate an actual key;
decrypt the at least the portion of the encrypted data using a third key to generate decrypted data; and
output the decrypted data to an output device.

10. The computer storage media of claim 9, wherein the wrapping key is stored on a data storage device of a computing device associated with the client.

11. The computer storage media of claim 9, wherein the key manager is a first key manager and wherein the wrapping key is stored on a second key manager.

12. The computer storage media of claim 9, wherein the wrapping key is stored on cloud storage.

13. The computer storage media of claim 9, wherein the key decryption component is further executed to cause the at least one processor to:
generate the wrapping key based on at least one user input provided by a user.

14. A data storage system comprising:
at least one data storage device storing encrypted data;
at least one processor; and
a memory, the memory storing a key decryption component, the at least one processor executing the key decryption component to:
obtain a pre-encrypted key from a key manager remote to the data storage device in response to sending a key identifier (ID) to the key manager, the pre-encrypted key is a cryptographic key generated by the key manager;
retrieve a wrapping key from the at least one data storage device, the wrapping key is a cryptographic key generated by the data storage system; decrypt the pre-encrypted key using the wrapping key to generate an actual key, the actual key is a cryptographic key for decrypting a portion of the encrypted data;
decrypt the portion of the encrypted data with a third key to generate decrypted data, wherein the wrapping key is a first wrapping key, wherein the pre-encrypted key is a first pre-encrypted key, and wherein the actual key is a first actual key;
encrypt additional data using a second actual key to generate additional encrypted data;
store the additional encrypted data on the at least one data storage device;
encrypt the second actual key using a second wrapping key to generate a second pre-encrypted key, wherein the second wrapping key is stored on a first key manager; and
send the second pre-encrypted key to a second key manager via a network for storage on the second key manger, wherein a party obtaining unauthorized access to the additional encrypted data and the pre-encrypted key stored by the key manager is unable to decrypt the additional encrypted data without the second wrapping key.

15. The data storage system of claim 14, further comprising:
a storage device key table comprising a set of key identifiers, the set of key identifiers comprising the key ID associated with the pre-encrypted key stored on the key manager and a wrapping key ID associated with the wrapping key stored on the at least one data storage device.

16. The data storage system of claim 15, further comprising:
an output device, wherein the decrypted data is output to a user via the output device, the decrypted data comprising plain-text data.

17. The data storage system of claim 14, wherein the wrapping key is a first wrapping key and the key manager is a first key manager and wherein the at least one processor executing the key decryption component to:
receive a second wrapping key from a second key manager via a network;
decrypt the pre-encrypted key based on the first wrapping key and the second wrapping key to generate the actual key.

18. The data storage system of claim 14, wherein the at least one processor executing the key decryption component to:
generate the wrapping key based on a user input provided by at least one user.

* * * * *